United States Patent
Li

(10) Patent No.: US 12,028,225 B2
(45) Date of Patent: Jul. 2, 2024

(54) SCALING METHOD AND APPARATUS

(71) Applicant: Huawei Technologies Co., Ltd., Shenzhen (CN)

(72) Inventor: Shitao Li, Nanjing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 18/345,468

(22) Filed: Jun. 30, 2023

(65) Prior Publication Data

US 2023/0362065 A1   Nov. 9, 2023

Related U.S. Application Data

(63) Continuation of application No. PCT/CN2020/141795, filed on Dec. 30, 2020.

(51) Int. Cl.
| | | |
|---|---|---|
| G06F 15/16 | (2006.01) | |
| H04L 41/0895 | (2022.01) | |
| H04L 41/40 | (2022.01) | |
| H04L 61/5061 | (2022.01) | |
| H04L 101/668 | (2022.01) | |

(52) U.S. Cl.
CPC .......... *H04L 41/40* (2022.05); *H04L 41/0895* (2022.05); *H04L 61/5061* (2022.05); *H04L 2101/668* (2022.05)

(58) Field of Classification Search
CPC . H04L 41/40; H04L 41/0895; H04L 61/5061; H04L 2101/668
USPC .......................................................... 709/226
See application file for complete search history.

(56) References Cited

U.S. PATENT DOCUMENTS

| | | | |
|---|---|---|---|
| 10,594,621 B2* | 3/2020 | Sharma | H04L 47/762 |
| 10,637,753 B1* | 4/2020 | Taft | H04L 43/04 |
| 10,897,467 B2* | 1/2021 | Celozzi | H04L 63/105 |
| 10,942,786 B2* | 3/2021 | Lacey | H04L 41/40 |
| 11,012,328 B2* | 5/2021 | Taft | H04L 43/04 |
| 11,438,210 B2* | 9/2022 | Ping | H04W 28/16 |
| 2018/0270073 A1* | 9/2018 | Senarath | H04L 12/1492 |
| 2019/0014056 A1* | 1/2019 | Sharma | H04L 47/762 |
| 2019/0132330 A1* | 5/2019 | Celozzi | H04L 41/0895 |
| 2020/0328953 A1* | 10/2020 | Taft | H04W 24/10 |

* cited by examiner

*Primary Examiner* — Moustafa M Meky
(74) *Attorney, Agent, or Firm* — Conley Rose, P.C.

(57) ABSTRACT

A scaling method related to the field of network function virtualization (NFV) includes a VNF manager (VNFM) that receives a virtualized network function (VNF) scale out request from an NFV orchestrator (NFVO), where the request includes VNF instance information and indication information that indicates a scale aspect and step; the VNFM determines, based on the VNF scale out request, information about a virtualization deployment unit (VDU) and a corresponding subnet that need to be created; and the VNFM requests creation of the VDU and the corresponding subnet from a virtualized infrastructure manager (VIM).

20 Claims, 9 Drawing Sheets

SCALING METHOD AND APPARATUS

CROSS-REFERENCE TO RELATED APPLICATIONS

This is a continuation of International Patent Application No. PCT/CN2020/141795 filed on Dec. 30, 2020. The aforementioned patent application is hereby incorporated by reference in its entirety.

TECHNICAL FIELD

This disclosure relates to the field of network function virtualization (NFV), and in particular, to a virtualized network function (VNF) or network service (NS) scaling method and apparatus.

BACKGROUND

NFV is a technology that a telecommunication network operator performs software and hardware decoupling on some telecommunication network functions (such as a core network function) in a common server, switch, and storage device by using a virtualization technology in an information technology (IT) field, to implement fast and efficient deployment and operation of an NS, and reduce network investment expenditure or capital expenditure (CAPEX) and operation expenditure (OPEX). Based on the NFV technology, the telecommunication network function is implemented in a form of software, can be run on common server hardware, and can be migrated, instantiated, and deployed at different physical positions of a network as required, without a need to install a new device.

FIG. 1 shows a VNF descriptor or description template (VNFD) design instance provided in an existing European Telecommunications Standards Institute (ETSI) NFV standard. The VNFD includes two virtualization deployment units (VDUs): VDU_1 and VDU_2. Each VDU is associated with one connection point descriptor or description template (CPD) that is used to describe or define CP_1 and CP_2, and one virtual link descriptor or description template (VLD) that is used to describe or define a virtual link (VL), where the VL is used to connect VDU_1 and VDU_2.

Information included in CP_1 may be as follows:

```
address_data:
    address_type: ip_address
    l3_address_data:
        ip_address_assignment: true
        floating_ip_activated: true
        ip_address_type: ipv4
        number_of_ip_address: 6
```

The foregoing information describes information about an Internet Protocol (IP) address requirement of CP_1, the ip_address_type parameter indicates that an IP address type required by the CP is IP version 4 (ipv4), and the number_of_ip_address parameter indicates that a minimum quantity of IP addresses required by the CP is 6.

Similar information is included in CP_2, and may be as follows:

```
address_data:
    address_type: ip_address
    l3_address_data:
        ip_address_assignment: true
        floating_ip_activated: true
        ip_address_type: ipv4
        number_of_ip_address: 10
```

The foregoing information describes information about an IP address requirement of CP_2, the ip_address_type parameter indicates that an IP address type required by the CP is ipv4, and the number_of_ip_address parameter indicates that a minimum quantity of IP addresses required by the CP is 10.

Information included in the VLD may be as follows:

```
vl_profile:
    virtual_link_protocol_data:
    - associated_layer_protocol: ethernet
      l2_protocol_data:
          network_type: vlan
    - associated_layer_protocol: ipv4
      l3_protocol_data:
          ip_version: ipv4
          ip_allocation_pools:
              - start_ip_address: 192.168.1.1
              - end_ip_address: 192.168.1.100
```

The foregoing information describes requirement information of a network connection between the VDUs, and the requirement information includes layer-2 network information l2_protocol_data and layer-3 network information l3_protocol_data. l3_protocol_data indicates that a layer-3 network connection is based on ipv4, and ip_allocation_pools defines information about an IP address resource pool of a layer-3 network, where a start IP address is 192.168.1.1, and a last IP address is 192.168.1.100, to learn that the IP address resource pool includes 100 IP addresses.

The VNFD further includes scaling information. For example, two scaling levels may be defined as follows:
1. Three instances for VDU_1 and four instances for VDU_2; and
2. Six instances for VDU_1 and eight instances for VDU_2.

For level 1, a quantity of IP addresses required by three VDUs_1 may be calculated as 3*6=18, and a quantity of IP addresses required by four VDUs_2 may be calculated as 4*10=40. Therefore, a total quantity of required IP addresses is 18+40=58. These VDU instances are all connected to the VL created by using the VLD. An IP address pool included in the VL includes a total of 100 IP addresses, so that an IP address allocation requirement can be met.

For level 2, a quantity of IP addresses required by six VDUs_1 may be calculated as 6*6=24, and a quantity of IP addresses required by eight VDUs_2 may be calculated as 8*10=80. Therefore, a total quantity of required IP addresses is 24+80=104. These VDU instances are all connected to the VL created by using the VLD. The IP address pool included in the VL includes the total of 100 IP addresses. Clearly, in this case, the VL cannot meet the IP address allocation requirement.

For a VNFD or a network service descriptor or description template (NSD) defined in a current standard, especially for a scaling scenario, only an increase in a quantity of VDUs or VNFs is considered, and for a VL, only a connection bandwidth is adjusted, and other factors such as a quantity of IP address that can be allocated are not considered. The VNFD or the NSD is designed at an initial stage of VNF or NS deployment. It is difficult to directly plan a large IP address resource pool for the VL, because a waste may be caused (the IP address resource pool is used only during scaling out to a specific level), and even if a planned IP address resource pool is large, IP addresses may be insufficient during scaling.

SUMMARY

Embodiments of the present disclosure provide a scaling method and apparatus, to avoid insufficiency of IP addresses allocated in a scaling process of a VNF or an NS in the conventional technology.

To achieve the foregoing objective, the following technical solutions are used in embodiments of this disclosure.

According to a first aspect, an embodiment of this disclosure provides a scaling method, including a VNF manager (VNFM) that receives a VNF scale out request from an NFV orchestrator (NFVO), where the request includes VNF instance information and indication information that indicates a scale aspect and step, the VNFM determines, based on the VNF scale out request, information about a VDU and a corresponding subnet that need to be created, and the VNFM requests creation of the VDU and the corresponding subnet from a virtualized infrastructure manager (VIM).

In a possible implementation, that the VNFM determines, based on the VNF scale out request, information about a VDU and a corresponding subnet that need to be created includes that the VNFM finds a corresponding VNFD based on the VNF instance information, and queries the VNFD based on the indication information, to determine the information about the VDU and the corresponding subnet that need to be created. The VNFD includes scale aspect parameter information and scale step parameter information, and the scale step parameter information includes subnet information.

In a possible implementation, the subnet information includes one or more of the following: a quantity of subnets, and a type and a range of an IP address that can be allocated in each subnet. The scale step parameter information further includes a parameter indicating whether the created VDU is connected to the subnet.

According to a second aspect, an embodiment of this disclosure provides a scaling method, including an NFVO that receives an NS scale out request, where the request includes NS instance information and indication information that indicates a scale aspect and step, the NFVO determines, based on the NS scale out request, information about a VNF and a corresponding subnet that need to be created, and the NFVO requests creation of the VNF and the corresponding subnet from a VIM through a VNFM.

In a possible implementation, that the NFVO determines, based on the NS scale out request, information about a VNF and a corresponding subnet that need to be created includes that the VNFM finds a corresponding NSD based on the NS instance information, and queries the NSD based on the indication information, to determine the information about the VNF and the corresponding subnet that need to be created. The NSD includes scale aspect parameter information and scale step parameter information, and the scale step parameter information includes subnet information.

According to a third aspect, an embodiment of this disclosure provides a communication apparatus, to implement the method according to any one of the first aspect or the possible implementations of the first aspect. The apparatus includes a corresponding unit or component configured to perform the foregoing method. The unit included in the apparatus may be implemented by software and/or hardware. The apparatus may be, for example, a terminal, or a chip, a chip system, or a processor that can support the terminal in implementing the foregoing method.

According to a fourth aspect, an embodiment of this disclosure provides a communication apparatus, to implement the method according to any one of the second aspect or the possible implementations of the second aspect. The apparatus includes a corresponding unit or component configured to perform the foregoing method. The unit included in the apparatus may be implemented by software and/or hardware. The apparatus may be, for example, a network device, or a chip, a chip system, or a processor that can support the network device in implementing the foregoing method.

According to a fifth aspect, an embodiment of this disclosure provides a computer-readable medium. The computer-readable medium stores a computer program or instructions. When the computer program or the instructions is/are executed, a computer is enabled to perform the method according to any one of the first aspect or the possible implementations of the first aspect.

According to a sixth aspect, an embodiment of this disclosure provides a computer-readable medium. The computer-readable medium stores a computer program or instructions. When the computer program or the instructions is/are executed, a computer is enabled to perform the method according to any one of the second aspect or the possible implementations of the second aspect.

According to a seventh aspect, an embodiment of this disclosure provides a scaling system. The system includes an NFVO, a VNFM, and a VIM that are respectively configured to implement steps performed by the NFVO, the VNFM, and the VIM in any possible method in the first aspect or the second aspect.

It may be understood that any communication apparatus, chip, computer-readable medium, computer program product, communication system, or the like provided above is configured to perform the corresponding method provided above. Therefore, a beneficial effect that can be achieved by the communication apparatus, the chip, the computer-readable medium, the computer program product, the communication system, or the like is to avoid insufficiency of IP addresses allocated when a VNF or an NS is scaled out in the conventional technology, and avoid a waste of resources due to directly defining a large IP address resource pool in the conventional technology.

DESCRIPTION OF EMBODIMENTS

The following describes implementations of embodiments of this disclosure in detail with reference to the accompanying drawings.

Figure 1:
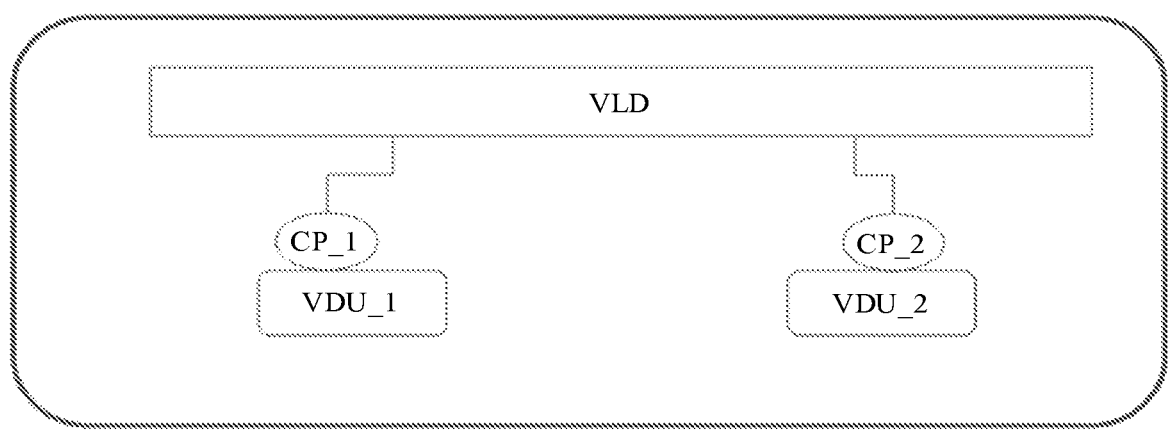
FIG. 1 is a schematic diagram of a VNFD design instance.
Figure 2:
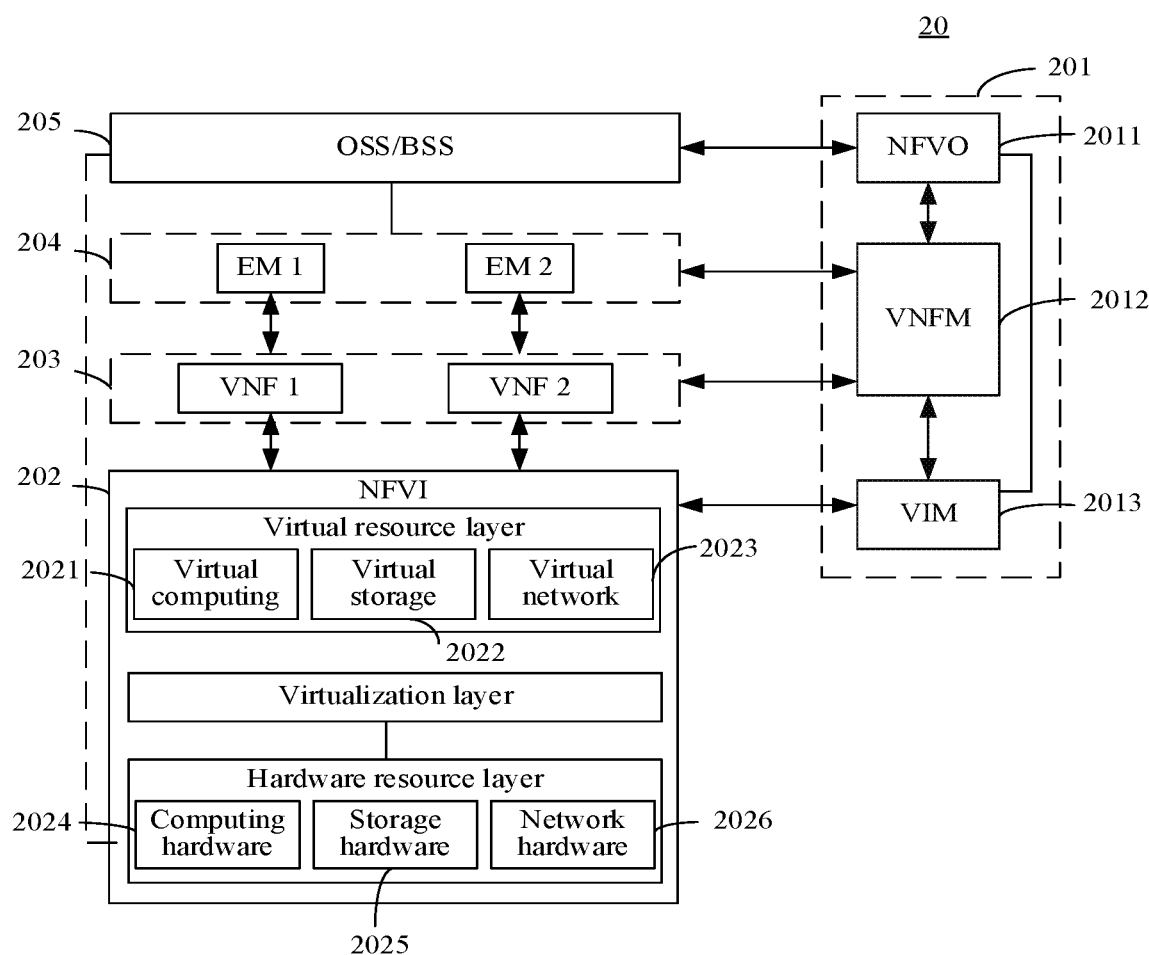
FIG. 2 is a schematic diagram of an architecture of an NFV network system according to an embodiment of this disclosure.

FIG. 2 is a schematic diagram of an architecture of an NFV system 20 according to an embodiment of this disclosure. The NFV system 20 may be used in various networks, for example, implemented in a data center (a data center 201 shown in FIG. 2), an operator network, or a local area network. The NFV system 20 includes an NFV management and orchestration system (MANO) 201, an NFV infrastructure (NFVI) 202, a plurality of VNFs 203, a plurality of element managements (EMs) 204, and an operation support system/business support system (OSS/BSS) 205.

The NFV MANO 201 may be configured to monitor and manage the NFVI 202 and the VNF 203. The NFV MANO 201 may include an NFVO 2011, one or more VNFMs 2012, and a VIM 2013. The NFVO 2011 may be configured to manage a life cycle of a virtualized service, allocate and schedule a virtual resource in the NFVI 202, and so on. Further, the NFVO 2011 may communicate with one or more VNFMs 2012 to execute a resource-related request. The NFVO 2011 may further send configuration information to the VNFM 2012 to collect status information of the VNF 203. In addition, the NFVO 2011 may further communicate with the VIM 2013 to perform resource allocation and/or reservation, and exchange configuration and status information of a virtualized hardware resource. The VNFM 2012 may be configured to manage a life cycle of one or more VNFs, for example, instantiate the VNF 203, update the VNF 203, query the VNF 203, scale the VNF 203, and terminate the VNF 203. Further, the VNFM 2012 may communicate with the VNF 203 to complete VNF life cycle management and exchange configuration and status information. A plurality of VNFMs may be included in the NFV system. Different VNFMs can manage life cycles of different types of VNFs. The VIM 2013 may control and manage interaction between the VNF 203 and computing hardware 2024, storage hardware 2025, network hardware 2026, virtual computing 2021, a virtual storage 2022, and a virtual network 2023. For example, the VIM 2013 may perform a resource management function, including managing an infrastructure resource, allocating (for example, adding a resource to a virtual container) and running a function (for example, collecting NFVI fault information). The VNFM 2012 and the VIM 2013 may communicate with each other to request resource allocation, exchange the configuration and status information of the virtualized hardware resource, and so on.

The NFVI 202 in FIG. 2 includes a hardware resource layer, a virtualization layer, and a virtual resource layer. Deployment of a virtualization environment is completed based on a hardware resource, a software resource, or a combination of the hardware resource and the software resource included in the NFVI 202. In other words, the hardware resource layer and the virtualization layer are used to provide a virtualized resource, for example, a virtual machine and a virtual container in another form, to be used for the VNF 203. The hardware resource layer includes the computing hardware 2024, the storage hardware 2025, and the network hardware 2026. The computing hardware 2024 may be existing hardware in the market and/or user-customized hardware, and is configured to provide a processing and computing resource. The storage hardware 2025 may be a storage capacity provided in a network or a storage capacity of the storage hardware 2025 (a local memory in a server). In an implementation solution, resources of the computing hardware 2024 and the storage hardware 2025 may be centralized. The network hardware 2026 may be a switch, a router, and/or any other network device that is configured to have a switching function. The network hardware 2026 may span a plurality of domains, and may include a plurality of networks interconnected by one or more transport networks. The virtualization layer in the NFVI 202 may abstract the hardware resource from a physical layer and decouple the VNF 203, to provide a virtualized resource to the VNF 203. The virtual resource layer includes the virtual computing 2021, the virtual storage 2022, and the virtual network 2023. The virtual computing 2021 and the virtual storage 2022 may be provided for the VNF 203 in a form of a virtual machine and/or another virtual container. For example, one or more VNFs 203 may be deployed on one virtual machine (VM). The virtualization layer abstracts the network hardware 2026 to form the virtual network 2023, where the virtual network 2023 may include a virtual switch, and the virtual switch is configured to provide a connection between virtual machines.

In terms of hardware, the computing hardware 2024, the storage hardware 2025, and the network hardware 2026 may include a plurality of subracks, a plurality of racks, or even a plurality of equipment rooms. In terms of software, one VIM 2013 may exist, or a plurality of VIMs may exist and separately manage different hardware resources.

The EM 204 is a system for network element configuration and management in a conventional telecommunication system. In the NFV system, the EM 204 may also be configured to configure and manage the VNF, and initiate a life cycle management operation such as instantiation of a new VNF to the VNFM.

The OSS/BSS 205 supports a variety of end-to-end telecommunication services. Management functions supported by the OSS include network configuration, service provision, fault management, and the like. The BSS may be configured to process orders, payments, income, and the like, and supports product management, order management, revenue management, and customer management.

The NFV system 20 shown in FIG. 2 is merely used as an example, and is not intended to limit the technical solutions of this disclosure. A person skilled in the art should understand that, in a specific implementation process, the NFV system 20 may further include another network element, and a quantity of network elements may be determined based on a specific requirement. This is not limited.

Optionally, each network element in FIG. 2 in this embodiment of this disclosure, for example, the NFVO 2011, the VIM 2013, or the OSS/BSS 205, may be a functional module in an apparatus. It may be understood that the functional module may be an element in a hardware device, a software functional module run on hardware, or a virtualization function instantiated on a platform (for example, a cloud platform).

Figure 3:
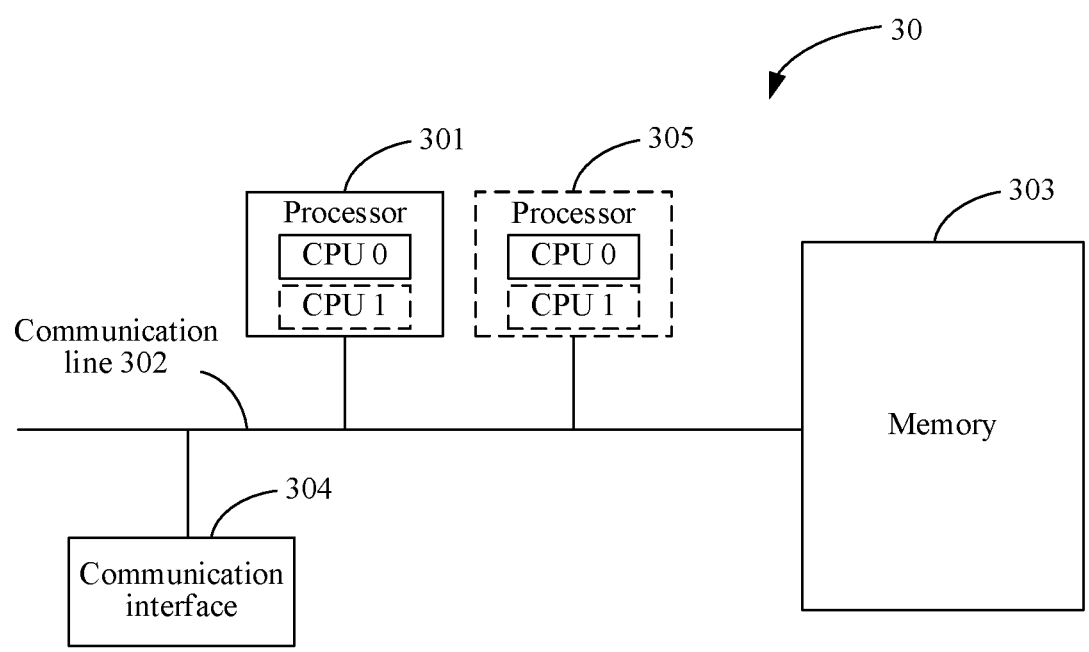
FIG. 3 is a schematic diagram of a hardware structure of a communication apparatus of each NFV network element according to an embodiment of this disclosure.

For example, each network element in FIG. 2 may be implemented by a communication apparatus 30 in FIG. 3. FIG. 3 is a schematic diagram of a hardware structure of a communication apparatus that may be used in an embodiment of this disclosure. The communication apparatus 30 includes at least one processor 301 and at least one communication interface 304, and is configured to implement a method provided in embodiments of this disclosure. The communication apparatus 30 may further include a communication line 302 and a memory 303.

The processor 301 may be a general-purpose central processing unit (CPU), a microprocessor, an application-specific integrated circuit (ASIC), or one or more integrated circuits configured to control program execution of the solutions of this disclosure.

The communication line 302 may include a path for transferring information between the foregoing components, for example, a bus.

The communication interface 304 is configured to communicate with another device or a communication network. The communication interface 304 may be any apparatus such as a transceiver, for example, may be an Ethernet interface, a radio access network (RAN) interface, a wireless local area network (WLAN) interface, a transceiver, a pin, a bus, or a transceiver circuit.

The memory 303 may be a read-only memory (ROM) or another type of static storage device that can store static information and instructions or a random-access memory (RAM) or another type of dynamic storage device that can store information and instructions, or may be an electrically erasable programmable ROM (EEPROM), a compact disc (CD) ROM (CD-ROM) or another CD storage medium, an optical disc storage medium (including a compact disc, a laser disc, an optical disc, a DIGITAL VERSATILE DISC (DVD), a BLU-RAY disc, or the like) and a magnetic disk storage medium or another magnetic storage device, or any other medium that can be configured to carry or store expected program code in a form of an instruction or a data structure and that is accessible by a computer, but is not limited thereto. The memory may exist independently, and is coupled to the processor 301 through the communication line 302. The memory 303 may alternatively be integrated with the processor 301. The memory provided in this embodiment of this disclosure generally may be non-volatile. The memory 303 is configured to store computer-executable instructions for performing the solutions provided in embodiments of this disclosure, and the processor 301 controls execution of the computer-executable instructions. The processor 301 is configured to execute the computer-executable instructions stored in the memory 303, to implement the method provided in embodiments of this disclosure.

The computer-executable instructions in this embodiment of this disclosure may also be referred to as application program code. This is not limited in embodiments of this disclosure.

The coupling in this embodiment of this disclosure may be an indirect coupling or a communication connection between apparatuses, units, or modules in an electrical form, a mechanical form, or another form, and is used for information exchange between the apparatuses, the units, or the modules.

In an embodiment, the processor 301 may include one or more CPUs, for example, a CPU 0 and a CPU 1 in FIG. 3.

In an embodiment, the communication apparatus 30 may include a plurality of processors, for example, the processor 301 and a processor 305 in FIG. 3. Each of the processors may be a single-core (single-CPU) processor, or may be a multi-core (multi-CPU) processor. The processor herein may be one or more devices, circuits, and/or processing cores configured to process data (for example, computer program instructions).

The communication apparatus 30 may be a general-purpose device or a special-purpose device. In a specific implementation, the communication apparatus 30 may be a desktop computer, a network server, or a device having a structure similar to that in FIG. 3. A type of the communication apparatus 30 is not limited in this embodiment of this disclosure.

With reference to FIG. 4 to FIG. 9, the following describes in detail a scaling method provided in an embodiment of this disclosure.

It should be noted that names of messages between network elements, names of parameters in the messages, or the like in the following embodiments of this disclosure are merely examples, and there may be other names in a specific implementation. This is not limited in embodiments of this disclosure.

It should be noted that, in embodiments of this disclosure, "/" may represent an "or" relationship between associated objects. For example, A/B may represent A or B. "And/or" may be used to describe that three relationships exist between associated objects. For example, A and/or B may represent the following three cases: only A exists, both A and B exist, and only B exists. A and B may be singular or plural.

To facilitate description of the technical solutions in embodiments of this disclosure, in embodiments of this disclosure, terms such as "first" and "second" may be used to distinguish between technical features with same or similar functions. The terms such as "first" and "second" do not limit a quantity and an execution sequence, and the terms such as "first" and "second" do not indicate a definite difference. In embodiments of this disclosure, the term such as "example" or "for example" is used to represent an example, an illustration, or a description. Any embodiment or design scheme described with "example" or "for example" should not be explained as being more preferred or having more advantages than another embodiment or design scheme. Use of the term such as "example" or "for example" is intended to present a related concept in a specific manner for ease of understanding.

It should be noted that in embodiments of this disclosure, for a technical feature, the terms such as "first", "second", "third", "A", "B", "C", and "D" are used to distinguish technical features in the technical feature, and there is no chronological order or no size order between the technical features described by "first", "second", "third", "A", "B", "C", and "D".

It may be understood that a same step or a step or a technical feature having a same function in embodiments of this disclosure may be mutually referenced in different embodiments.

It may be understood that in embodiments of this disclosure, an NFVO, a VIM, and/or a VNFM may perform some or all of the steps in embodiments of this disclosure. These steps are merely examples. In embodiments of this disclosure, another step or variations of various steps may be further performed. In addition, the steps may be performed in a sequence different from a sequence presented in embodiments of this disclosure, and not all the steps in embodiments of this disclosure need to be performed.

In embodiments of this disclosure, a specific structure of an execution body of a method for establishing a network connection is not particularly limited in embodiments of this disclosure, provided that the method provided in embodiments of this disclosure can be implemented. For example, the method for establishing a network connection provided in embodiments of this disclosure may be performed by the NFVO or a component used in the NFVO, for example, a chip. This is not limited in this disclosure. Alternatively, the method for establishing the network connection provided in embodiments of this disclosure may be performed by the VIM or a component used in the VIM, for example, a chip. This is not limited in this disclosure. Alternatively, the method for establishing a network connection provided in embodiments of this disclosure may be performed by the VNFM or a component used in the VNFM, for example, a chip. This is not limited in this disclosure. In the following embodiments, an example in which the method for establishing a network connection is separately performed by the NFVO, the VIM, and the VNFM is used for description.

Figure 4:
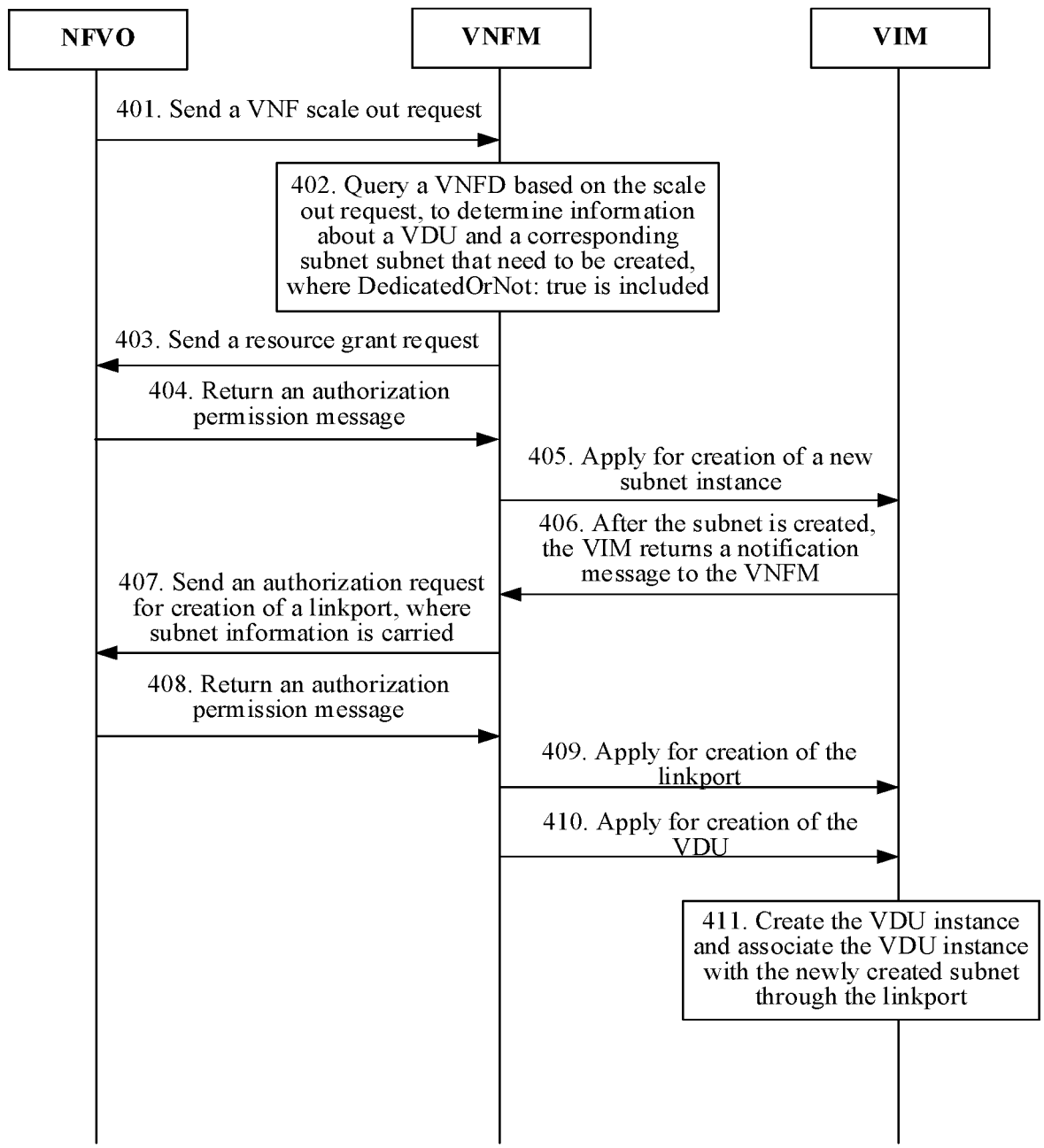
FIG. 4 is a schematic flowchart of a scaling (scaling out) method according to Embodiment 1 of this disclosure.

FIG. 4 is a flowchart of Embodiment 1 of the present disclosure. Both Embodiment 1 and Embodiment 2 describe a scaling out process in VNF scaling (or scaling). A main difference lies in whether a newly created VDU needs to be connected to or associated with a newly created subnet. In Embodiment 1, the connection or the association is required, and in Embodiment 2, the connection or the association is not required.

The following describes specific implementation steps of Embodiment 1.

401. An NFVO sends a VNF-specific scaling request (or a VNF scaling request) to a VNFM. In this embodiment, the request is a scale out request, and the request includes VNF instance information (for example, a VNF instance ID), and indication information that indicates a scale aspect or range and step.

For specific meanings of the foregoing professional terms or names (such as the aspect and the step), refer to related descriptions in an existing NFV standard (such as IFA011 v4.1.1). The indication information that indicates the scale aspect mainly includes AspectId, the ID corresponds to a scale aspect defined in a VNFD, and the scale aspect in the VNFD includes specific and related information such as a name, a quantity, and/or a feature of a VDU and a VL. The indication information that indicates the step mainly includes a scaling step in the aspect, for example, step 1 or step 2.

402. The VNFM receives the VNF scale out request, finds a corresponding VNFD based on the VNF instance information in the request, and queries the VNFD based on the indication information, to determine information about a VDU and a corresponding subnet that need to be created.

An aspect defined in a VNFD in the conventional technology includes a scaling detail parameter ScalingDelta, as shown in the following table:

| Parameter | Quantity | Description |
|---|---|---|
| ... | | |
| vduDelta | 0, ..., or N | VDU scaling detail parameter, mainly a quantity of related VDU instances |
| virtualLinkBitRateDelta | 0, ..., or N | Virtual link scaling detail parameter, mainly a bit rate of a related virtual link |

Parameters such as vduDelta and virtualLinkBitRateDelta are mainly included. The vduDelta parameter describes the VDU scaling detail parameter, mainly the quantity of related VDU instances. The virtualLinkBitRateDelta parameter describes the virtual link scaling detail parameter, mainly the bit rate of the related virtual link.

In this embodiment of the present disclosure, a virtualLinkBitRateDeltaAspect parameter in ScalingDelta included in the existing VNFD is changed and extended as follows:

| Parameter | Quantity | Description |
|---|---|---|
| ... | | |
| vduDelta | 0, ..., or N | VDU scaling detail parameter for the aspect, mainly the quantity of related VDU instances |
| virtualLinkDelta | 0, ..., or N | Virtual link scaling detail parameter for the aspect, including a VL bit rate, subnet information, and the like |

The name of virtualLinkBitRateDelta in the existing VNFD may be changed to virtualLinkDelta (or the name may not be changed), and included specific parameters are as follows:

| Attribute | Qualifier | Content | Description |
|---|---|---|---|
| vnfVirtualLinkDescId | M | Identifier (Reference to VnfVirtualLinkDesc) | Corresponding virtual link descriptor in the VNFD |
| bitrateRequirements | M | LinkBitrateRequirements | Bit rate information |
| NumberofSubnet | O | Integer | Quantity of subnets |
| SubnetInfo | M | L3ProtocolData | Subnet information |
| DedicatedOrNot | O | Boolean | Whether a subnet is used only for a newly created VDU instance |

NumberofSubnet, SubnetInfo, and DedicatedOrNot above are newly added parameters in this embodiment of the present disclosure.

Different steps are defined in the VNFD based on the foregoing extension. For example, the following two steps may be defined:

Step 1: A total of three instances for VDU_1, a total of four instances for VDU_2, and the VL bit rate of 4 gigabits per second (Gbps); and Step 2: A total of six instances for VDU_1, a total of eight instances for VDU_2, and the VL bit rate of 8 Gbps.

In addition, in step 2, the newly added parameters: NumberofSubnet: N (where N is an integer greater than or equal to 1), SubnetInfo (including content L3ProtocolData), and DedicatedOrNot: true/false are included or associated with. DedicatedOrNot: true/false is optional. If N is 1, it indicates that one subnet needs to be created. The foregoing parameter L3ProtocolData defines information required for creating the subnet, including an IP address type and range, as follows:

```
l3_protocol_data:
    ip_version: L3ProtocolData
    ip_allocation_pools:
      - start_ip_address: 192.168.10.1
      - end_ip_address: 192.168.10.100
```

If N is greater than 1, a quantity of SubnetInfo parameters is also N. Because the NumberofSubnet parameter is optional, if there is no NumberofSubnet parameter, a quantity of subnets to be added is the same as the quantity of SubnetInfo parameters, and one subnet is correspondingly added for each SubnetInfo parameter.

DedicatedOrNot: true/false indicates whether the newly created subnet needs to be connected to or associated with the above newly created VDU. True indicates that the newly created subnet needs to be connected to or associated with the newly created VDU. False indicates that a newly created VDU instance does not need to be associated with a new subnet instance. The newly created VDU instance may be first associated with an existing subnet instance in the VL, and associated with new subnet information if no subnet instance is available. In Embodiment 1, a value of DedicatedOrNot is true.

After receiving the VNF scale out request, the VNFM first finds the corresponding VNFD based on the VNF instance information in the request, for example, a VNF instance ID. The VNFD is the extended VNFD. Then, the VNFM queries the VNFD based on the indication information. Further, the VNFM searches the VNFD based on the aspect ID included in the indication information, to determine a scale aspect or range. Then, the VNFM searches the VNFD based on the step information in the indication information, to determine a required scale step and related content. For example, if the aspect ID in the VNF scale out request is an ID XXX, the VNFM searches the VNFD, to determine that an aspect corresponding to the ID XXX in the VNFD includes VDU_1, VDU_2, and the VL. In addition, if the step indication information in the VNF scale out request is step 2, the VNFM searches the VNFD, to determine that at step 2 in the foregoing example, six VDU_1 instances and eight VDU_2 instances need to be created, the VL bit rate is 8 Gbps, and one new subnet needs to be created. A specific instantiation parameter is included in L3ProtocolData, and the newly created VDU needs to be associated with the subnet. A quantity of newly created VDUs is a quantity of VDUs at the corresponding step minus a quantity of VDUs included in a VNF that is not scaled. In this example, a total of six VDU_1 instances and eight VDU_2 instances need to be created at step 2. Quantities of the newly created VDU_1 instances and VDU_2 instances are respectively a quantity of VDU_1 instances being 6 minus a quantity (for example, 3) of VDU_1 instances in the VNF that is not scaled and a quantity of VDU_2 instances being 8 minus a quantity (for example, 6) of VDU_2 instances in the existing VNF. In this case, the quantities of newly created VDU_1 instances and VDU_2 instances are respectively 3 and 2. A manner of determining a quantity of subnets to be created is different from that for the foregoing VDU to be created. NumberofSubnet: 1 indicates that one new subnet needs to be created, and a quantity of existing subnets in a virtual link VL in the existing VNF is not considered.

403. The VNFM sends a resource grant request to the NFVO, in other words, requests to authorize creation of a resource, including a new VDU instance resource and a new subnet resource that need to be created and that are determined in step 402. For the subnet resource, the request includes the following:

```
AddResource:
  Type: Subnet
  ResourceTemplateId: VLD (an ID of the VLD in the VNFD)
  L3ProtocolData
```

404. The NFVO returns an authorization permission message to the VNFM, where the message carries VIM access information and the like.

405. The VNFM applies to a VIM for creation of a new subnet instance based on the information about the subnet determined in step 402, where the subnet includes information about a new IP address range or resource pool, which, for example, may be as follows:

```
start_ip_address: 192.168.10.1
end_ip_address: 192.168.10.100
```

406. After the subnet is created, the VIM returns a subnet instance creation completion notification message and instance information to the VNFM.

407. After receiving the subnet creation completion notification message, the VNFM initiates an authorization request for creation of a linkport to the NFVO. The request carries the following information:

```
AddResource:
  Type: Linkport
  Subnet instance information
```

This indicates that the linkport that needs to be created is associated with the newly created subnet instance.

408. The NFVO sends an authorization permission message to the VNFM.

409. The VNFM initiates linkport creation to the VIM, where information about the subnet instance that needs to be associated with is carried.

410. The VNFM applies to the VIM for creation of a new VDU instance, where a type of the VDU and a quantity of VDUs determined in step 402 are carried, and information about the newly created linkport is carried.

411. After the VDU instance is created, the VIM associates the VDU instance with the newly created subnet through the linkport, and the newly created subnet allocates an IP address to the VDU instance.

In this embodiment of the present disclosure, the parameters such as NumberofSubnet and SubnetInfo are added to the newly defined VNFD. Therefore, during the scaling out, a corresponding quantity of IP addresses may be allocated based on a scale-out size (corresponding to different steps), to dynamically meet an address requirement of the newly created VDU. This can avoid insufficiency of IP addresses allocated when a VNF is scaled out in the conventional technology, and avoid a waste of resources due to directly defining a large IP address resource pool in the conventional technology.

Figure 5:
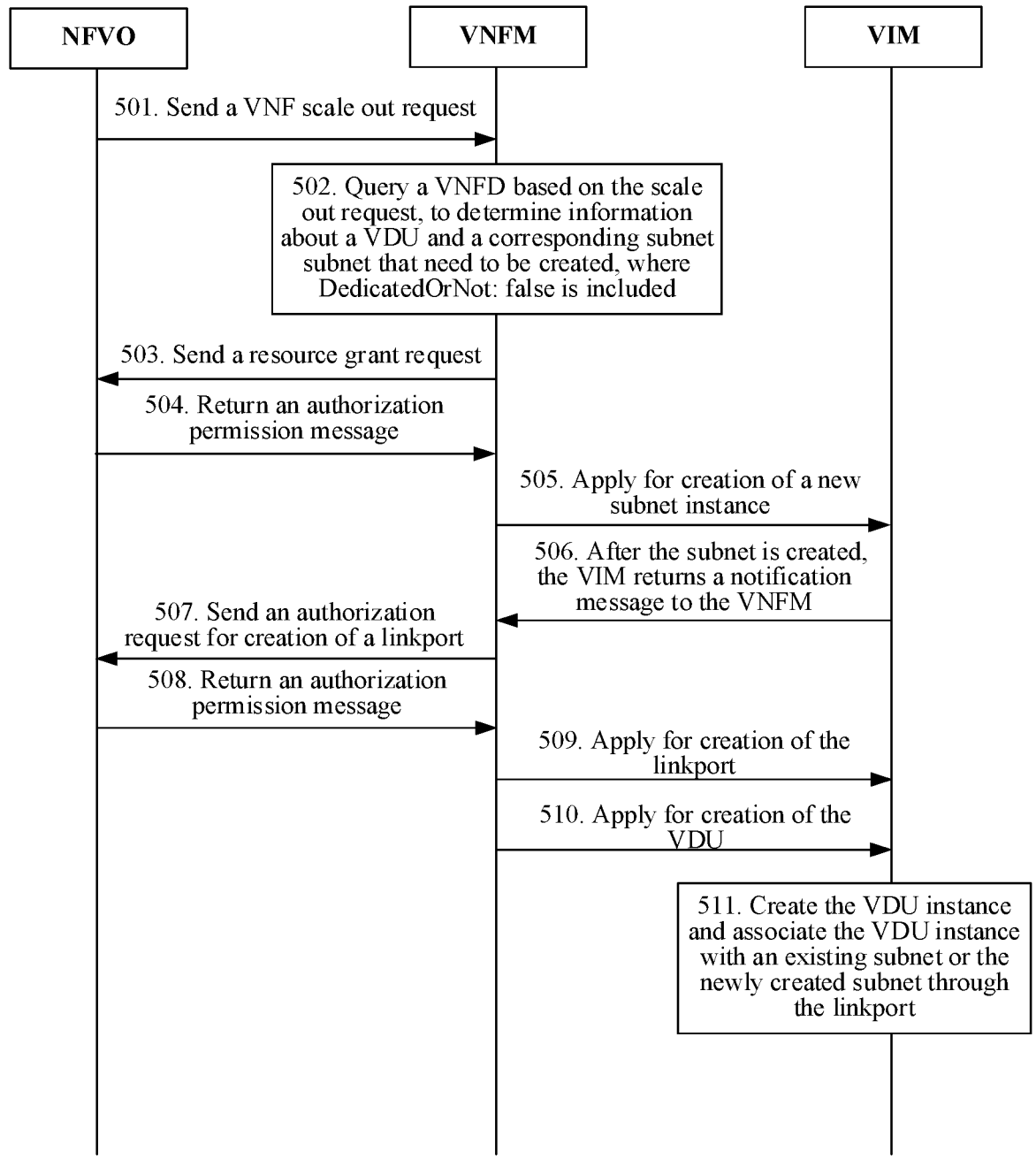
FIG. 5 is a schematic flowchart of a scaling (scaling out) method according to Embodiment 2 of this disclosure.

FIG. 5 is a flowchart of Embodiment 2. A difference between Embodiment 2 and Embodiment 1 lies in that a newly created VDU does not need to be connected to or associated with a newly created subnet.

The following describes specific implementation steps of Embodiment 2:

501. This step is the same as step 401 in Embodiment 1.

502. A difference from step 402 in Embodiment 1 lies in that a value of DedicatedOrNot included in step 2 defined in a VNFD is false, indicating that a newly added VDU instance does not need to be associated with a newly created subnet instance.

503 to 506. Steps are the same as steps 403 to 406 in Embodiment 1.

507. The value of DedicatedOrNot in step 2 in the VNFD is false. Therefore, the new VDU instance does not need to be associated with the new subnet instance. Therefore, a linkport authorization request initiated by the VNFM to the NFVO carries only linkport information, and does not carry subnet information. For example, the following may be shown:

AddResource:
    Type: Linkport

508. This step is the same as step 508 in Embodiment 1.

509. The VNFM applies to the VIM for creation of a linkport. If the VNFM determines that an IP address can be allocated in a subnet in an original VL network, the newly created linkport is associated with existing subnet information. Otherwise, the newly created linkport is associated with new subnet information.

510. This step is the same as step 410 in Embodiment 1.

511. After the VDU instance is created, the VIM associates the VDU instance with an existing subnet through the linkport (where an IP address can also be allocated in the subnet in the original VL network). The existing subnet allocates an IP address to the VDU instance or associates the VDU instance with the newly created subnet, and the newly created subnet allocates an IP address to the VDU instance.

Figure 6:
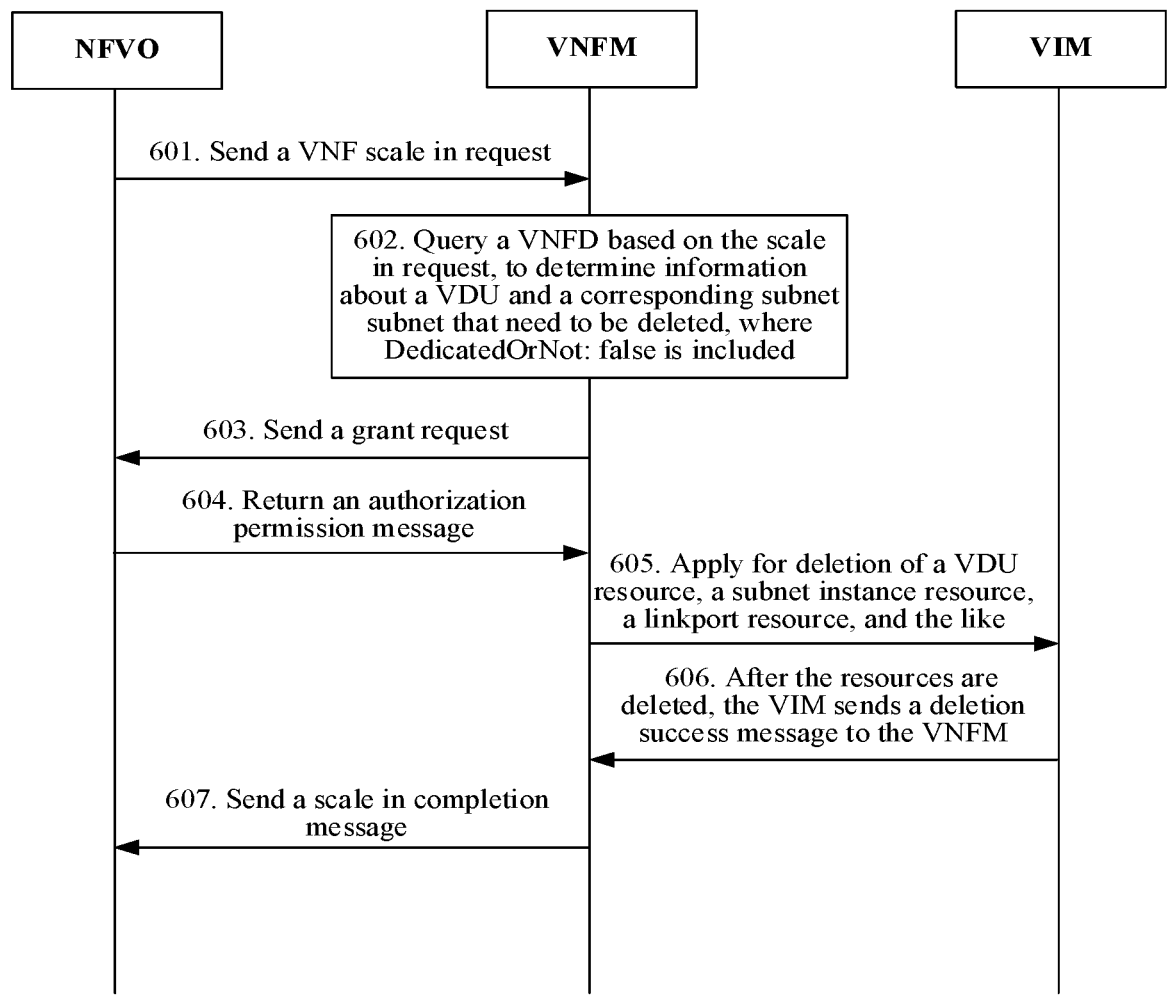
FIG. 6 is a schematic flowchart of a scaling (scaling in) method according to Embodiment 3 of this disclosure.

FIG. 6 is a flowchart of Embodiment 3 of the present disclosure. Embodiment 3 shows subsequent steps of Embodiment 1 or 2, and describes a VNF scaling in process.

The following describes specific implementation steps of Embodiment 3:

601. An NFVO sends a VNF-specific scaling request to a VNFM. In this embodiment, the request is a scale in request, and the request includes VNF instance information (for example, a VNF instance ID) and indication information that indicates a scale aspect and step.

For example, if a current VNF is at step 2, and step 1 is indicated in the indication information, the VNF is scaled in from step 2 to step 1.

602. The VNFM receives the VNF scale in request, finds a corresponding VNFD based on the VNF instance information in the request, and queries the VNFD based on the indication information, to determine information about a VDU and a corresponding subnet that need to be deleted. In this embodiment, a VNFD that is the same as that in Embodiment 1 is still used, and the VNFD still includes the following two steps:

Step 1: A total of three instances for VDU_1, a total of four instances for a VDU_2, and a VL bit rate of 4 Gbps; and Step 2: A total of six instances for VDU_1, a total of eight instances for VDU_2, a VL bit rate of 8 Gbps, NumberofSubnet: 1, L3ProtocolData, and DedicatedOrNot: true.

In this case, when the VNF is scaled in from step 2 to step 1, three instances for VDU_1 need to be reduced, four instances for VDU_2 need to be reduced, and one subnet (similar to the newly created subnet in Embodiment 1) needs to be deleted from a VL.

603. The VNFM sends a grant request to the NFVO. A RemoveResource parameter in the grant request includes description information about a subnet resource, a computing resource (corresponding to the VDU), and a linkport resource that need to be deleted.

604. The VNFM receives an authorization permission message from the NFVO.

605. The VNFM applies to a VIM for deletion of the corresponding subnet resource, a virtual machine resource corresponding to the VUD, the linkport resource, and the like.

606. The VIM sends a resource deletion success message to the VNFM.

607. The VNFM sends a scale in completion message to the NFVO.

Figure 7:
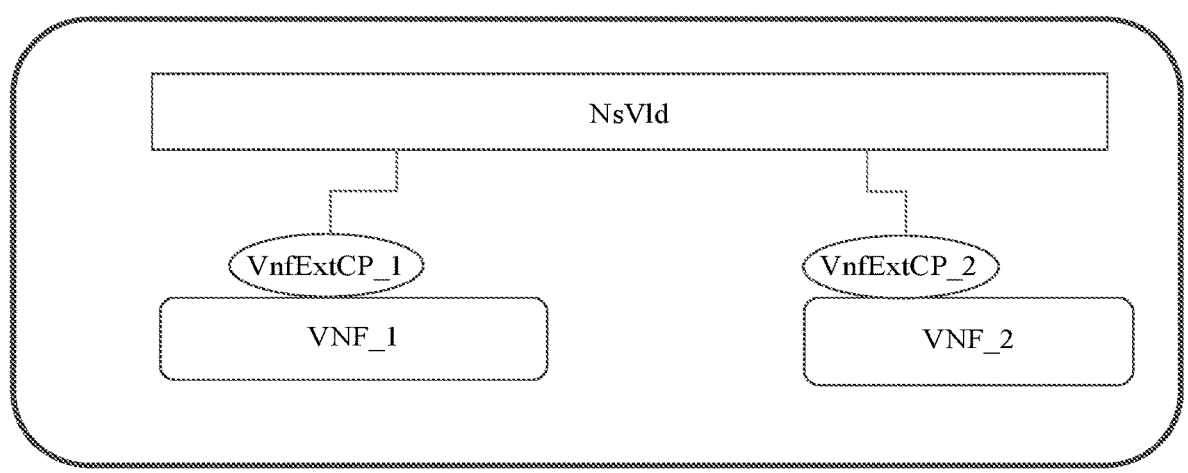
FIG. 7 is a schematic diagram of an NSD design instance according to Embodiment 4 of this disclosure.

Embodiments of the present disclosure may be further extended to a scaling scenario of an NS. FIG. 7 is a schematic diagram of an NSD design instance. The instance mainly includes a VNFD that describes a VNF, for example, a corresponding VNFD 1 and VNFD 2 that describe VNF_1 and VNF_2 in the figure, NsVld that describes a VL, and a descriptor that describes an external connection point (ExtCp) of the VNF. VnfExtCP_1 and VnfExtCP_2 in the figure are external connection points of VNF_1 and VNF_2.

The foregoing Embodiment 1 to Embodiment 3 describe a scenario in which scaling is performed for the VNF. When scaling is performed for the NS, an IP address insufficiency problem also occurs in NsVld for correspondingly connecting VNF_1 and VNF_2. The foregoing problem may also be resolved by using an NS scaling process in the following Embodiment 4 and Embodiment 5 of the present disclosure.

Figure 8:
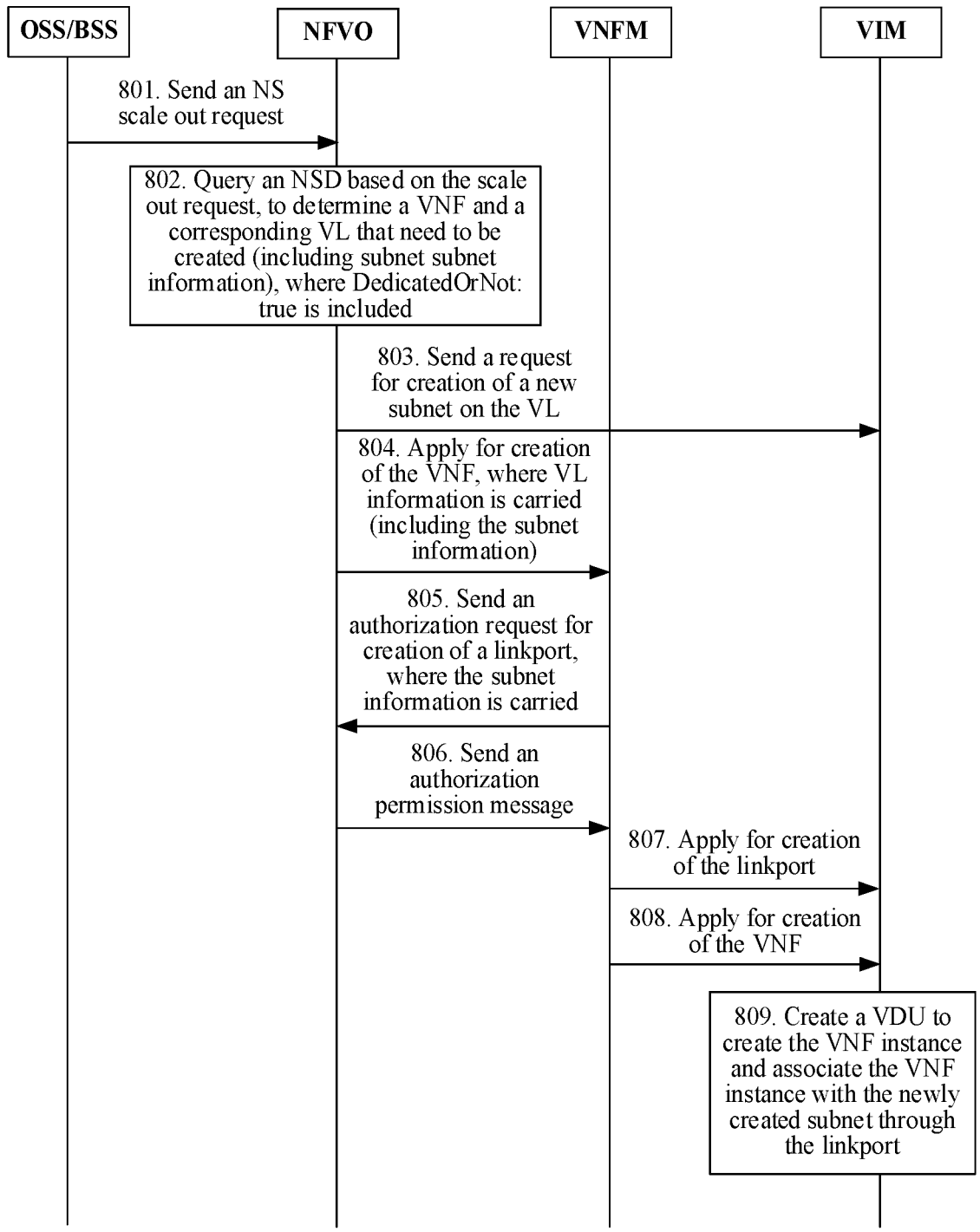
FIG. 8 is a schematic flowchart of a scaling (scaling out) method according to Embodiment 4 of this disclosure.

FIG. 8 is a flowchart of NS scaling according to Embodiment 4 of the present disclosure, and is a scaling out flowchart. Specific steps of Embodiment 4 are as follows:

801. An NFVO receives an NS-specific scaling request (or an NS scaling request) from an OSS/BSS. In this embodiment, the request is a scale out request, and the request includes NS instance information (for example, an NS instance ID) and indication information that indicates a scale aspect and step.

802. The NFVO receives the scale out request, finds a corresponding NSD based on the NS instance information in the request, and queries the NSD based on the indication information, to determine information about a VNF and a corresponding subnet that need to be created.

For NSD content, in this embodiment, virtualLinkToLevelMapping information (similar to virtualLinkBitRateDelta in ScalingDelta of a VNFD) in NsLevel is mainly extended.

Extended virtualLinkToLevelMapping includes the following information:

| Attribute | Qualifier | Content | Description |
|---|---|---|---|
| virtualLinkProfileId | M | Identifier (Reference to VirtualLinkProfile) | Corresponding VL information in the NSD |
| bitrateRequirements | M | LinkBitrateRequirements | Bit rate information |
| NumberofSubnet | O | Integer | Quantity of subnets |
| SubnetInfo | M | L3ProtocolData | Subnet information |
| DedicatedOrNot | O | Boolean | Whether a subnet is used only for a newly created VNF instance |

Based on the new extension, the following two steps may be defined in NsLevel (the following specific numbers are used as examples):

Step 1: A total of three instances for VNF_1, a total of four instances for VNF_2, and a VL bit rate of 4 Gbps; and Step 2: A total of six instances for VNF_1, a total of eight instances for VNF_2, and a VL bit rate of 8 Gbps.

In addition, in step 2, the newly added parameters: NumberofSubnet: N (where N is an integer greater than or equal to 1), SubnetInfo (including content L3ProtocolData), and DedicatedOrNot: true/false are included or associated with. DedicatedOrNot: true/false is optional.

Meanings of the foregoing newly added parameters are the same as those in Embodiment 1 and Embodiment 2, and details are not described herein again. In this embodiment, a value of DedicatedOrNot is true.

After receiving the scale out request, the NFVO first finds the corresponding NSD based on the NS instance information in the request, for example, an NS instance ID. The NSD is the extended NSD. Then, the NFVO queries the NSD based on the indication information. Further, the NFVO searches the NSD based on the aspect in the indication information, to determine a scale object or aspect. Then the NFVO searches the NSD based on the step in the indication information, to determine a required scale step. For example, if the aspect in the VNF scale out request includes VNF_1, VNF_2, and a VL, at step 2, the VNFM searches the NSD, to determine that at step 2 in the foregoing example, six VNF_1 instances and eight VNF_2 instances need to be created, a VL bit rate is 8 Gbps, and one new subnet needs to be created. A specific instantiation parameter is included in L3ProtocolData, and the newly created VNF needs to be associated with the subnet. A quantity of newly created VNFs is a quantity of VNFs at the corresponding step minus a quantity of VNFs included in a VNF that is not scaled. In this example, a total of six VNF_1 instances and eight VNF_2 instances need to be created at step 2. Quantities of the newly created VNFs_1 instances and VNF_2 instances are respectively a quantity of VNF_1 instances being 6 minus a quantity (for example, 2) of VNF_1 instances of the VNF that is not scaled, and a quantity of VNF_2 instances being 8 minus a quantity (for example, 5) of VNF_2 instances of an existing VNF. In this case, the quantities of newly created VNF_1 instances and VNF_2 instances are respectively 4 and 3. A manner of determining a quantity of subnets to be created is different from that for the foregoing VNF to be created. NumberofSubnet: 1 indicates that one new subnet needs to be created, and a quantity of existing subnets in a virtual link VL in the existing VNF is not considered.

803. The NFVO determines, based on information about the VL (step 2 information), that one new subnet needs to be created on an original VL instance, and applies to a VIM for creation of the subnet.

804. The NFVO sends a VNF instantiation request to the VNFM based on the new VNF instance that needs to be created, where the request carries information about the VL instance to which the VNF needs to be connected (by using VnfExtCp_1). Because a value of DedicatedOrNot in step 2 defined in Nslevel in the NSD is true, the VL instance information further includes information about the subnet instance newly created in step 803.

805. Optionally, if step 804 does not include linkport information of the subnet to which the new VNF instance is connected, the VNFM sends a grant request to the NFVO, authorizes creation of a new linkport, and adds association information with the same subnet instance to addResource.

806. The NFVO sends an authorization permission message to the VNFM.

807. The VNFM applies to the VIM for creation of a linkport, where information about the new subnet is included.

808. The VNFM applies to the VIM for creation of a new VNF instance for the new VNF instance that needs to be created, and connects to the subnet by using VnfExtCp_1 and the newly created linkport.

809. The VIM creates a VDU to create the VNF instance and associates the VNF instance with the newly created subnet through the linkport.

Figure 9:
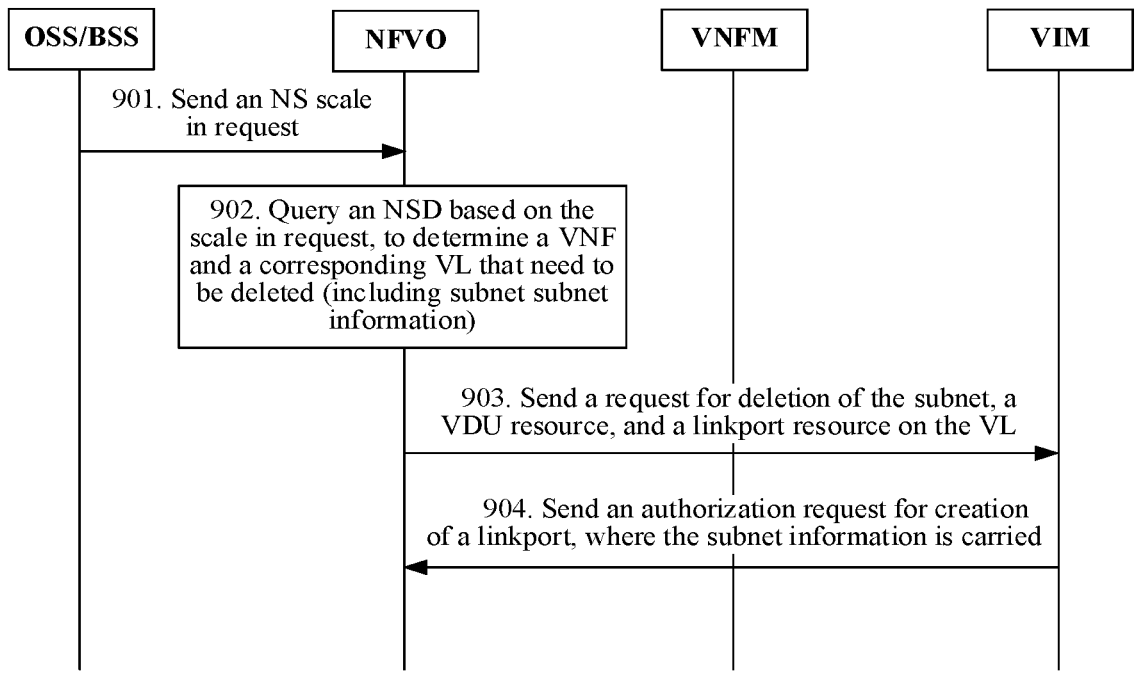
FIG. 9 is a schematic flowchart of a scaling (scaling in) method according to Embodiment 5 of this disclosure.

Embodiment 5 of the present disclosure is a scale in process in NS scaling, which is similar to a scale in process of a VNF. As shown in FIG. 9, specific steps are as follows:

901. An NFVO receives an NS-specific scaling request from an OSS/BSS. In this embodiment, the request is further a scale in request, and the request includes NS instance information (for example, an NS instance ID) and indication information that indicates a scale aspect and step.

For example, if a current VNF is at step 2, and step 1 is indicated in the indication information, the NS is scaled in from step 2 to step 1.

902. After receiving the NS scale in request, the NFVO finds a corresponding NSD based on the NS instance ID information in the request, and queries the NSD based on the indication information, to determine information about a VNF and a corresponding subnet that need to be deleted. In this embodiment, an NSD that is the same as that in Embodiment 4 is still used, and two steps may be defined in NsLevel as follows (the following specific numbers are used as examples):

Step 1: A total of three instances for VNF_1, a total of four instances for VNF_2, and a VL bit rate of 4 Gbps; and Step 2: A total of six instances for VNF_1, a total of eight instances for VNF_2, and a VL bit rate of 8 Gbps.

In addition, new parameters: NumberofSubnet: 1, SubnetInfo (including content L3ProtocolData), and DedicatedOrNot: true/false are added in step 2. DedicatedOrNot: true/false is optional.

In this case, when the NS is scaled in from step 2 to step 1, three instances for the VNF_1 need to be reduced, four instances for the VNF_2 need to be reduced, and one subnet needs to be deleted from a VL.

903. The NFVO applies to a VIM for deletion of a corresponding subnet resource, virtual machine resources corresponding to different VDUs included in the VNF, a linkport resource, and the like.

904. The VIM deletes the resource and sends a resource deletion success message to the NFVO.

Actions of the NFVO, the VNFM, or the VIM in the method steps in the foregoing embodiments may be performed by the processor 401 in the communication apparatus 40 shown in FIG. 4 by invoking the application program code stored in the memory 403. This is not limited in embodiments.

The foregoing mainly describes the solutions provided in embodiments of this disclosure from a perspective of interaction between network elements. It may be understood that, to implement the foregoing functions, the NFVO, the VNFM, the VIM, or the like includes corresponding hardware structures and/or software modules for performing the functions. A person skilled in the art should be easily aware that, in combination with units and algorithm operations of the examples described in embodiments disclosed in this specification, this disclosure can be implemented by hardware or a combination of hardware and computer software.

Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this disclosure.

In embodiments of this disclosure, functional module division may be performed on the NFVO, the VNFM, the VIM, or the like based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that, in embodiments of this disclosure, module division is an example, and is merely a logical function division. During actual implementation, another division manner may be used.

Figure 10:
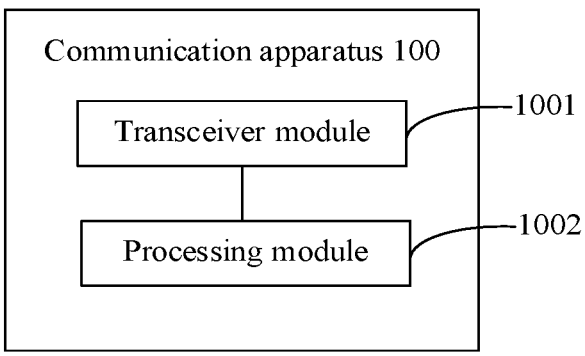
FIG. 10 is a schematic diagram of a structure of a communication apparatus according to an embodiment of this disclosure.

For example, when each functional module is obtained through division in an integrated manner, FIG. 10 is a schematic diagram of a structure of a communication apparatus 100. The communication apparatus 100 includes a transceiver module 1001 and a processing module 1002.

For example, the communication apparatus 100 is configured to implement a function of a VNFM. For example, the communication apparatus 100 is the VNFM in the embodiment shown in FIG. 4, the embodiment shown in FIG. 5, or the embodiment shown in FIG. 6.

In this embodiment of this disclosure, the communication apparatus 100 may be the VNFM, or may be a chip used in the VNFM, or another combined device, component, or the like that has the function of the VNFM. When the communication apparatus 100 is the VNFM, the transceiver module 1001 may be a transceiver. The transceiver may include an antenna, a radio frequency circuit, and the like. The processing module 1002 may be a processor (or a processing circuit), for example, a baseband processor, and the baseband processor may include one or more CPUs. When the communication apparatus 100 is a component having the function of the VNFM, the transceiver module 1001 may be a radio frequency unit, and the processing module 1002 may be a processor (or a processing circuit), for example, a baseband processor. When the communication apparatus 100 is a chip system, the transceiver module 1001 may be an input/output interface of a chip (for example, a baseband chip), and the processing module 1002 may be a processor (or a processing circuit) of the chip system, and may include one or more central processing units. It should be understood that the transceiver module 1001 in this embodiment of this disclosure may be implemented by a transceiver or a transceiver-related circuit component, and the processing module 1002 may be implemented by a processor or a processor-related circuit component (or a processing circuit).

For example, the transceiver module 1001 may be configured to perform all sending and receiving operations performed by the VNFM in the embodiment shown in FIG. 4, for example, S401 and S403, and/or configured to support another process of the technology described in this specification. The processing module 1002 may be configured to perform all operations, for example, S402, that are performed by the VNFM in the embodiment shown in FIG. 4 except the sending and receiving operations, and/or configured to support another process of the technology described in this specification.

For another example, the transceiver module 1001 may be configured to perform all sending and receiving operations performed by the VNFM in the embodiment shown in FIG. 6, for example, S601 and S603, and/or configured to support another process of the technology described in this specification. The processing module 1002 may be configured to perform all operations, for example, S602, that are performed by the VNFM in the embodiment shown in FIG. 6 except the sending and receiving operations, and/or configured to support another process of the technology described in this specification.

When the communication apparatus 100 is configured to implement the function of the VNFM, for another function that can be implemented by the communication apparatus 100, refer to related descriptions of the embodiments shown in FIG. 4 to FIG. 6, FIG. 8, and FIG. 9. Details are not described again.

Similarly, for example, the communication apparatus 100 may be configured to implement a function of an NFVO. For example, the communication apparatus 100 is the NFVO in the embodiment shown in FIG. 8 or the embodiment shown in FIG. 9, or may be the NFVO in embodiments shown in FIG. 4 to FIG. 6. Details are not described again.

In this embodiment of this disclosure, the communication apparatus 100 may be a VIM, or may be a chip used in the VIM, or another combined device, component, or the like that has a function of the VIM. When the communication apparatus 100 is the VIM, the transceiver module 1001 may be a transceiver. The transceiver may include an antenna, a radio frequency circuit, and the like. The processing module 1002 may be a processor (or a processing circuit), for example, a baseband processor, and the baseband processor may include one or more CPUs. When the communication apparatus 100 is a component having the function of the VIM, the transceiver module 1001 may be a radio frequency unit, and the processing module 1002 may be a processor (or a processing circuit), for example, a baseband processor. When the communication apparatus 100 is a chip system, the transceiver module 1001 may be an input/output interface of a chip (for example, a baseband chip), and the processing module 1002 may be a processor (or a processing circuit) of the chip system, and may include one or more central processing units. It should be understood that the transceiver module 1001 in this embodiment of this disclosure may be implemented by a transceiver or a transceiver-related circuit component, and the processing module 1002 may be implemented by a processor or a processor-related circuit component (or a processing circuit).

For example, the transceiver module 1001 may be configured to perform all sending and receiving operations performed by the VIM in the embodiments shown in FIG. 4 to FIG. 6, FIG. 8, and FIG. 9, and the processing module 1002 may be configured to perform all operations that are performed by the VIM in embodiments shown in FIG. 4 to FIG. 6, FIG. 8, and FIG. 9 except the sending and receiving operations, and/or configured to support another process of the technology described in this specification.

Figure 11:
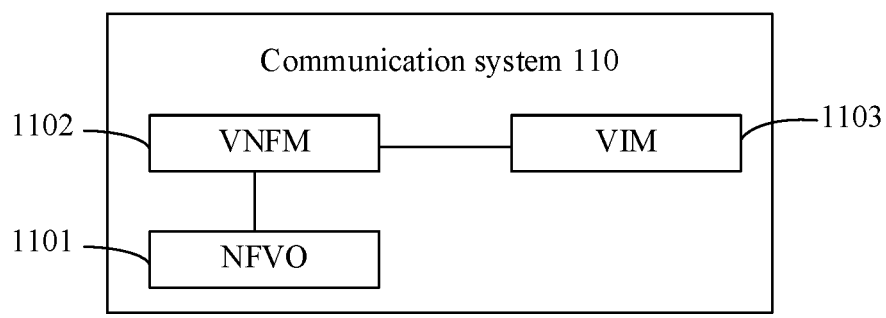
FIG. 11 is a schematic composition diagram of a communication system according to an embodiment of this disclosure.

FIG. 11 is a schematic composition diagram of a communication system. As shown in FIG. 11, the communication system 110 may include an NFVO 1101, a VNFM 1102, and a VIM 1103. It should be noted that FIG. 11 is merely an example drawing. A network element included in the communication system 110 shown in FIG. 11 and a quantity of network elements are not limited in embodiments of this disclosure.

The VNFM 1102 is configured to implement functions of the VNFM in the foregoing embodiments. For example, the VNFM 1102 may be configured to receive scaling request information from the NFVO 1101, query a VNFD based on the request information, determine information about a VDU and a corresponding subnet that need to be created, and apply to the VIM 1103 for creation of the VDU and the corresponding subnet.

The NFVO 1101 is configured to implement functions of the NFVO in the foregoing method embodiments, and the VIM 1103 is configured to implement functions of the VIM in the foregoing method embodiments. Details are not described again.

It should be noted that all related content of the steps in the foregoing method embodiments may be referenced to function descriptions of corresponding network elements of the communication system 110, and details are not described herein again.

The foregoing descriptions about the implementations allow a person skilled in the art to clearly understand that, for the purpose of convenient and brief description, division of the foregoing functional modules is used as an example for description. During actual application, the foregoing functions can be allocated to different modules and implemented as required, that is, an inner structure of an apparatus is divided into different functional modules to implement all or some of the functions described above.

In the several embodiments provided in this disclosure, it should be understood that the disclosed apparatus and method may be implemented in other manners. For example, the described apparatus embodiment is merely an example. For example, the module or unit division is merely logical function division and may be other division during actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or the units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of embodiments.

In addition, functional units in embodiments of this disclosure may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of embodiments of this disclosure essentially, or the part contributing to the conventional technology, or all or some of the technical solutions may be implemented in the form of a software product. The software product is stored in a storage medium and includes several instructions for instructing a device (which may be a single-chip microcomputer, a chip, or the like) or a processor to perform all or some of the steps of the methods described in embodiments of this disclosure. The foregoing storage medium includes any medium that can store program code, such as a Universal Serial Bus (USB) flash drive, a removable hard disk, a ROM, a RAM, a magnetic disk, or an optical disc.

The foregoing descriptions are merely specific implementations of this disclosure, but are not intended to limit the protection scope of this disclosure. Any variation or replacement within the technical scope disclosed in this disclosure shall fall within the protection scope of this disclosure. Therefore, the protection scope of this disclosure shall be subject to the protection scope of the claims.

What is claimed is:

1. A method implemented by a virtualized network function (VNF) manager (VNFM), wherein the method comprises:
   receiving, from a network function virtualization (NFV) orchestrator (NFVO), a VNF scale-out request comprising VNF instance information and indication information that indicates a scale aspect and a seal step;
   determining, based on the VNF scab-out request, information about a virtualization deployment unit (VDU) and a corresponding subnet to be created; and
   requesting, from a virtualized infrastructure manager (VIM), creation of the VDU and the corresponding subnet.

2. The method of claim 1, further comprising:
   finding, based on the VNF instance information, a corresponding VNF descriptor (VNFD), wherein the corresponding VNFD comprises scale aspect parameter information and scale step parameter information, and wherein the scale step parameter information comprises subnet information; and
   querying, based on the indication information, the corresponding VNFD to determine the information about the VDU and the corresponding subnet.

3. The method of claim 2, wherein the subnet information comprises one or more of:
   a quantity of subnets; or
   a type and a range of an Internet Protocol (IP) address that can be allocated in each subnet.

4. The method of claim 2, wherein the scale step parameter information further comprises a parameter indicating whether the VDU is coupled to the corresponding subnet.

5. The method of claim 4, further comprising requesting, from the VIM, creation of a linkport, wherein the VDU is coupled to the corresponding subnet through the linkport.

6. A method implemented by network function virtualization (NFV) orchestrator (NFVO), wherein the method comprises:
   receiving a network service (NS) scale-out request, NS instance information and indication information that indicates a scale aspect and a scale step;
   determining, based on the NS scale-out request, information about a virtualized network function (VNF) and a corresponding subnet to be created; and
   requesting, from a virtualized infrastructure manager (VIM) through a VNF manager (VNFM), creation of the VNF and the corresponding subnet.

7. The method according of claim 6, further comprising:
   finding, based on the NS instance information, a corresponding NS descriptor (NSD), wherein the corresponding NSD comprises scale aspect parameter information and scale step parameter information, and wherein the scale step parameter information comprises subnet information; and
   querying, based on the indication information, the corresponding NSD to determine the information about the VNF and the corresponding subnet.

8. The method of claim 7, wherein the subnet information comprises one or more of:
a quantity of subnets; or
a type and a range of an Internet Protocol (IP) address that can be allocated in each subnet.

9. The method of claim 7, wherein the scale step parameter information further comprises a parameter indicating whether the VNF is coupled to the corresponding subnet.

10. The method of claim 9, further comprising requesting, from the VIM, creation of a linkport, wherein the VNF is coupled to the corresponding subnet through the linkport.

11. A communication apparatus comprising:
a transceiver; and
at least one processor coupled to the transceiver and configured to:
receive, from a network function virtualization (NFV) orchestrator (NFVO) using the transceiver, a virtualized network function (VNF) scale-out request comprising VNF instance information and indication information that indicates a scale aspect and a scale step;
determines, based on the VNF scale-out request, information about a virtualization deployment unit (VDU) and a corresponding subnet to be created; and
request, from a virtualized infrastructure manager (VIM) using the transceiver, creation of the VDU and the corresponding subnet.

12. The communication apparatus of claim 11, wherein the the at least one processor, is further configured to:
find a corresponding VNF descriptor (VNFD) based on the VNF instance information, wherein the corresponding VNFD comprises scale aspect parameter information and scale step parameter information, and wherein the scale step parameter information comprises subnet information; and
query, based on the indication information, the corresponding VNFD to determine the information about the VDU and the corresponding subnet.

13. The communication apparatus of claim 12, wherein the subnet information comprises one or more of:
a quantity of subnets; or
a type and a range of an Internet Protocol (IP) address that can be allocated in each subnet.

14. The communication apparatus of claim 12, wherein the scale step parameter information further comprises a parameter indicating whether the VDU is coupled to the corresponding subnet.

15. The communication apparatus of claim 14, wherein the at least one processor, is further configured to request, from the VIM using the transceiver, creation of a linkport, and wherein the VDU is coupled to the corresponding subnet through the linkport.

16. A communication apparatus, comprising:
a transceiver; and
at least one processor coupled to the transceiver and configured to:
receive, using the transceiver, a network service (NS) scale-out request, comprising NS instance information and indication information that indicates a scale aspect and a scale step;
determines, based on the NS scale-out request, information about a virtualized network function (VNF) and a corresponding subnet to be created; and
request, from a virtualized infrastructure manager (VIM) through a VNF manager (VNFM) using the transceiver, creation of the VNF and the corresponding subnet from a.

17. The communication apparatus of claim 16, wherein the at least one processor, is further configured to:
find, based on the NS instance information, a corresponding NS descriptor (NSD), wherein the corresponding NSD comprises scale aspect parameter information and scale step parameter information, and wherein the scale step parameter information comprises subnet information; and
query, based on the indication information, the corresponding NSD to determine the information about the VNF and the corresponding subnet.

18. The communication apparatus of claim 17, wherein the subnet information comprises one or more of:
a quantity of subnets; or
a type and a range of an Internet Protocol (IP) address that can be allocated in each subnet.

19. The communication apparatus of claim 17, wherein the scale step parameter information further comprises a parameter indicating whether the VNF is coupled to the corresponding subnet.

20. The communication apparatus of claim 19, wherein the at least one processor is further configured to request, from the VIM using the transceiver, creation of a linkport, and wherein the VNF is coupled to the corresponding subnet through the linkport.

* * * * *

UNITED STATES PATENT AND TRADEMARK OFFICE
CERTIFICATE OF CORRECTION

PATENT NO. : 12,028,225 B2
APPLICATION NO. : 18/345468
DATED : July 2, 2024
INVENTOR(S) : Shitao Li It is certified that error appears in the above-identified patent and that said Letters Patent is hereby corrected as shown below:

In the Claims

Claim 1, Column 20, Line 18: "a seal step;" should read "a scale step;"

Claim 1, Column 20, Line 19: "VNF scab-out request," should read "VNF scale-out request,"

Claim 11, Column 21, Line 22: "determines, based" should read "determine, based"

Claim 16, Column 22, Line 14: "determines, based" should read "determine, based"

Claim 16, Column 22, Line 20: "subnet from a." should read "subnet."

Signed and Sealed this
Sixth Day of August, 2024

Katherine Kelly Vidal
*Director of the United States Patent and Trademark Office*